July 14, 1936.  A. L. WARNER  2,047,300
METHOD OF MAKING UNDER SERRATED MOWER SECTIONS
Filed May 22, 1935
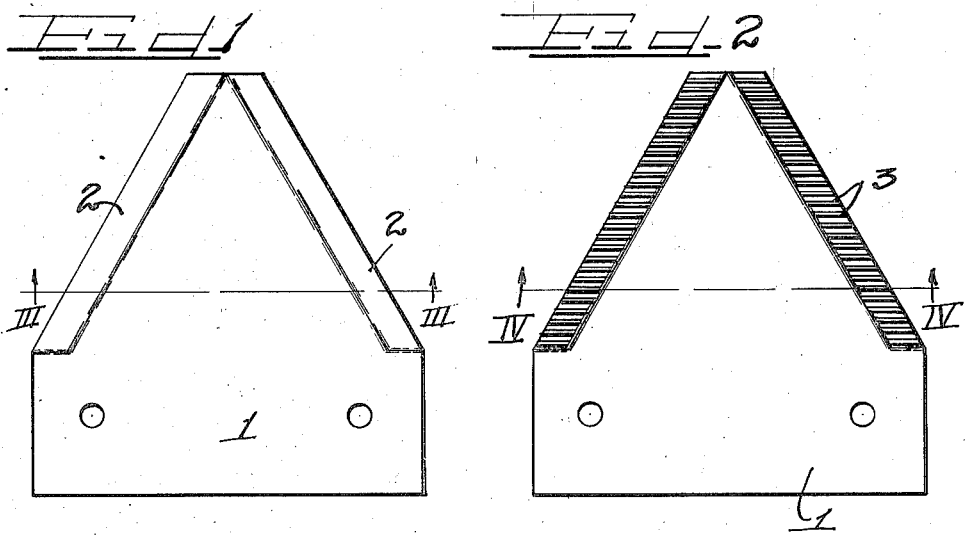
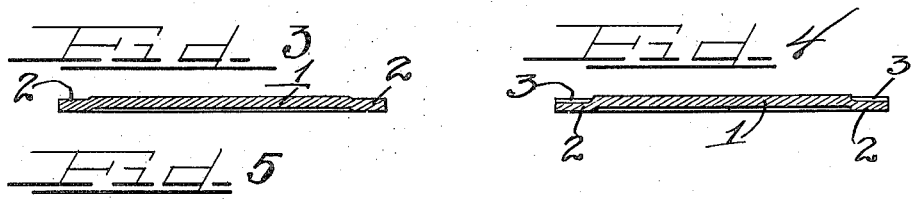
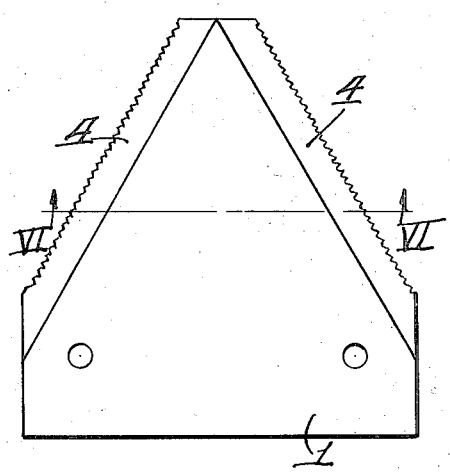
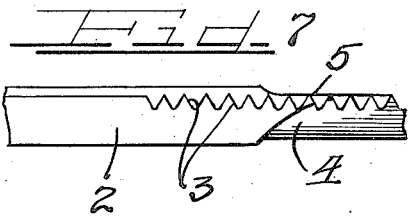
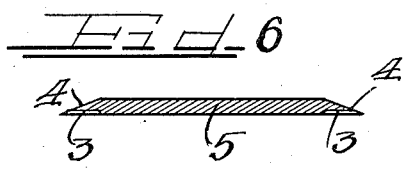
Inventor
Arthur L. Warner.
by Charles W. Hills
Attys.

Patented July 14, 1936

2,047,300

UNITED STATES PATENT OFFICE 2,047,300

METHOD OF MAKING UNDER-SERRATED MOWER SECTIONS

Arthur L. Warner, Elgin, Ill., assignor to Illinois Iron & Bolt Company, Carpentersville, Ill., a corporation of Illinois Application May 22, 1935, Serial No. 22,697

5 Claims. (Cl. 76—89.1)

This invention relates to a method of making underserrated mower sections or blades which are assembled on a cutter bar to effect the cutting operations in mowers, harvesters and similar machinery.

In the past, it has been customary to serrate the edges of a mower section and then sharpen the edges upon the opposite side of the section. This provided what is known to the trade as an underserrated section. Then the serrated face would be ground smooth. In grinding the serrated face, the serrations which projected above such face to the extent of the depressions therebetween would also be ground off, and this tended to destroy the sharpness of the serrations.

It is an object of this invention to overcome the above noted objection in the manufacture of mower sections by the use of a method that offsets the edges of the blanks either before or at the time that the edges are serrated in order that the tops of the serrations will be slightly below the face of the section which can be ground smooth without grinding down the serrations.

The invention comprises the novel method hereinafter described and more particularly pointed out and defined in the appended claims.

In the accompanying drawing, which illustrates a preferred form of this invention, and in which similar reference numerals refer to similar features in the different views:

Figure 1 is a plan view of a blank formed according to this invention for receiving serrations.

Figure 2 is a plan view of the blank with the serrations applied.

Figure 3 is a sectional view taken upon the line III—III of Figure 1, looking in the direction of the arrows.

Figure 4 is a sectional view taken upon the line IV—IV of Figure 2, looking in the direction of the arrows.

Figure 5 is a plan view of the reverse side of the blank after its edges have been ground.

Figure 6 is a sectional view taken upon the line VI—VI of Figure 5, looking in the direction of the arrows.

Figure 7 is a diagrammatic view illustrating the novel method.

In carrying out the process, a suitable metal blank is sheared from a plate or suitably formed with converging side portions. The lateral margins or converging edges of the blank that are to receive the cutting edges are slightly offset, as indicated at 2 upon the blank 1, as shown in Figure 1. This offsetting of the edges produces slight marginal depressions, as clearly shown in Figure 1. The serrations 3 are then formed in the marginal depressions by a suitable tool.

An alternate method which might be preferred, in that it saves one operation, consists in simultaneously forming the serrations and offsetting the serrated edges. According to this alternate method, the formed blank will be supported with its margins to be serrated free for offsetting purposes. Then, as the margins are serrated, by hammering with a suitable tool or the like, the margins will be offset, as shown in Figure 4.

After the serrating operation has been completed, the margins on the reverse side of the blank are bevelled or ground to a cutting edge, as indicated at 4 in Figure 5. The next step resides in grinding or smoothing the face of the section having the serrations, as indicated at 5 in Figure 7. During this smoothing or grinding operation, the serrations 3 being located slightly below the surface due to the offset margins, will consequently not be ground down, as has resulted from methods heretofore used.

In Figure 7, there is shown in diagrammatic form the results achieved by the different steps above described. Reference 2 shows the offset margin with the serrations 3 formed therein. Reference 4 indicates the bevel to produce the cutting edge, while reference 5 indicates the grinding or smoothing of the serrated face to a point flush with the serrations and without grinding the tops thereof.

I am aware that many changes may be made in the steps involving this method without departing from the principle thereof, and I therefore do not propose limiting the patent granted hereon otherwise than is necessitated by the scope of the appended claims.

I claim as my invention:

1. The herein described method of forming mower sections which consists in forming a blank, offsetting the lateral margins thereof, serrating said margins from the depressed side, grinding the edges upon the reverse side to produce a cutting edge, and then grinding and smoothing the undepressed portion of the serrated side.

2. The herein described method of making serrated cutting sections which consists in forming a blank with converging side portions, offsetting said portions to one side of the plane of said blank, serrating said offset portions, bevelling the opposite sides of said offset portions, and grinding the undepressed portion of the serrated side to smooth the same.

3. The herein described method of making serrated cutting sections which consists in offsetting the margins of a blank that are to form the cutting edges and serrating the same, grinding the opposite sides of said margins to produce cutting edges and grinding and smoothing the undepressed portion of the serrated side.

4. The herein described method of making serrated cutting sections which consists in simultaneously offsetting and serrating the lateral margins of the blank, bevelling the unserrated sides of said margins to produce cutting edges, and grinding the undepressed portion of the serrated face of said blank.

5. The herein described method of making serrated cutting sections which consists in forming a blank with substantially converging side edges, positioning said blank upon a support with the side margins free and extending therebeyond, then offsetting said side margins, serrating the said margins, beveling the unserrated sides of said margins to produce cutting edges and smoothing the unserrated portion of the serrated face.

ARTHUR L. WARNER.